INVENTORS
MERLIN A. STICELBER
JOHN E. MOHR
BY
Alfred R. Fuchs
ATTORNEY

Oct. 20, 1953  J. E. MOHR ET AL  2,655,875
DEFLECTING, GUIDING, AND SIZING MEANS
FOR LOAF MOLDING MECHANISMS
Filed June 7, 1948 4 Sheets-Sheet 3

INVENTORS
MERLIN A. STICELBER
JOHN E. MOHR
BY
Alfred R. Fuchs
ATTORNEY

Oct. 20, 1953

J. E. MOHR ET AL 2,655,875

DEFLECTING, GUIDING, AND SIZING MEANS
FOR LOAF MOLDING MECHANISMS

Filed June 7, 1948

INVENTORS
MERLIN A. STICELBER
JOHN E. MOHR

BY *Alfred R. Fuchs*
ATTORNEY

Patented Oct. 20, 1953

2,655,875

UNITED STATES PATENT OFFICE 2,655,875

DEFLECTING, GUIDING, AND SIZING MEANS FOR LOAF MOLDING MECHANISMS

John E. Mohr, Springfield, Ill., and Merlin A. Sticelber, Kansas City, Mo., assignors to Stickelber & Sons, Inc., a corporation of Missouri Application June 7, 1948, Serial No. 31,476

20 Claims. (Cl. 107—12)

1

Our invention relates to loaf molding mechanisms, and more particularly to deflecting, guiding and sizing means for sheeted dough pieces in such molding mechanisms.

In molding machines that are provided with automatic panning devices, it is necessary that the pieces of sheeted dough that are curled up on themselves to form the loaves will be properly located and of proper size before entering the loaf forming mechanism so that the curled up piece of dough forming the molded loaf will be fed into the pan in proper alignment therewith and of the proper length to prevent any portion of the loaf from overlapping either end of the pan.

In order for the loaves to be properly fed into the pans, not only must these be of proper length, but if a baked loaf of bread is to be obtained that is of uniform cross sectional size from end to end thereof, the completely molded loaf of bread must be of substantially the same cross sectional size from end to end thereof. When loaf forming mechanisms are utilized that cooperate with the conveyor belt that carries the completely molded loaves to the pans of the panning mechanism, the sheeted pieces of dough that are to be curled must be fed to the loaf forming mechanism always from the same position transversely of the belt for each succeeding loaf and must also be of substantially uniform dimension transversely of the belt in order that the molded loaf will be of uniform length.

It has been found that the texture of loaves of bread is improved by curling or rolling up the pieces of dough in a direction transversely of the direction in which these were rolled or sheeted in the sheeting mechanism ordinarily provided in molding machines for loaves of bread. This rolling up or curling of the sheeted pieces of dough transversely to the direction of sheeting produces a more uniform grain in the baked loaf and eliminates the occasionally large holes that develop in the loaf during the proofing operation when such transverse curling is not performed.

In order to make use of transverse curling it is necessary to place the sheeted piece of dough on the conveyor belt of the loaf molding and panning mechanism in a position that the dough piece will lie on the conveyor belt with the edges that first and last passed from the sheeting mechanism extending lengthwise of substantially lengthwise of the conveyor belt, and with what were the side edges of the piece of dough as it left the sheeting mechanism becoming the forward and rear edges of the piece of dough when on the loaf molding and panning conveyor belt.

2

Without means for definitely locating one edge of the dough piece that has been sheeted relative to one side edge of this conveyor belt, it is impossible to successfully utilize the transverse curling of sheeted pieces of dough in conjunction with automatic panning thereof, because the successive dough pieces fed to the conveyor belt will be located at different positions crosswise of the conveyor belt and will thus be fed to the curling mechanism in different positions, resulting in loaves that are much thicker at one end than the other and in loaves that pass from the conveyor belt to the pans in various locations crosswise of this conveyor belt, causing either one or both ends of the completely molded loaf to overlap the ends of the pans, resulting in misshaped loaves, unless a hand operation is performed to re-arrange the molded loaf of bread in the pan after being fed into it.

While various ways of feeding dough pieces to this conveyor belt, that has the loaf forming and panning mechanism associated therewith, have been proposed, whereby it was expected that the dough pieces would be fed exactly to the same position on this conveyor belt as the successive dough pieces passed onto this conveyor belt, it has been found that in practice these feeding devices will not operate successfully. One proposal was to attempt to flip the piece of dough flatwise onto the conveyor belt from a considerable height above the conveyor belt. The dough pieces turned over during this flipping so that the side that was uppermost after being sheeted was downward when it reached the conveyor belt. As the flipping mechanism involved the necessity of sudden release of the dough piece from a belt or drum or similar member, the adhesiveness of the dough to the belt or drum or similar member and its weight determined the flipping action that was accomplished, and it has been found that a very slight variation in the tendency of the dough piece to stick to the belt or drum or similar flipping device or slight variations in weight of the dough piece will cause a very decided variation in the position in which the dough piece lands on the conveyor belt.

It has been found that much more reliable feeding, avoiding the possibility of the dough piece adhering to such flipping mechanism so as to not pass completely onto the conveyor belt, is accomplished by providing a conveyor that extends crosswise of the panning and loaf molding conveyor and feeds the dough piece to said panning and loaf molding mechanism conveyor from a position at one side thereof and only at a very slightly higher level than said loaf molding and panning conveyor belt. The crosswise extending conveyor belt feeds the dough pieces from the sheeting mechanism at high speed and discharges the sheeted pieces of dough with considerable momentum across the loaf molding and panning conveyor belt. By providing means for halting the transverse movement of the dough piece at a definite point and shooting the dough piece across said conveyor belt with such force that it will always pass into engagement with such stop means, the one edge of the dough piece that extends substantially parallel to the side edge of the curling and panning mechanism conveyor belt is located at a definite fixed spacing from said side edge of the conveyor belt and each and every successive piece of dough will have that side edge thereof at exactly the same spacing from the side edge of the conveyor belt.

In the use of our invention the dough pieces are sheeted so that the same are approximately of the same maximum transverse and longitudinal dimension, or of slightly greater transverse than longitudinal dimension, as these leave the sheeting mechanism. Accordingly, when these dough pieces pass onto the conveyor belt that forms part of the loaf forming and panning mechanism, these sheeted pieces of dough either are of the same maximum dimension lengthwise as crosswise of this belt, or of slightly greater dimension lengthwise of this belt than crosswise thereof. It has been found desirable to make the dough pieces have a greater length on this belt than width to get the desired shape to the molded loaf after it has been completely molded. Our sizing and guiding means accomplishes this by slightly reducing the dimension of the piece of dough crosswise of the conveyor belt, while at the same time forming a substantially straight edge along the side of the piece of dough that was forward when it was projected onto the conveyor belt crosswise thereof.

This slight re-shaping of the piece of dough is accomplished without any substantial amount of working of the piece of dough, the dough piece being very slightly thickened along the straight edge thereof and being changed from a shape that was substantially circular to one that has one straight side edge and is otherwise substantially circular.

More specifically our invention comprises means for directing the sheeted piece of dough being forcibly projected transversely of a conveyor belt toward the conveyor belt to deflect the piece of dough downwardly into engagement with the upper surface of the conveyor belt substantially flatwise, and for stopping the transverse movement of the sheeted piece of dough at a precisely determined position from the side edge of the conveyor belt most remote from that from which the sheeting was done.

It is a further purpose of our invention to provide deflecting, guiding and sizing means for dough pieces comprising a belt that is mounted above the conveyor belt that forms part of the loaf forming and panning mechanism, and which has the lower run thereof traveling in the same direction as said conveyor belt, and which cooperates with the panning mechanism belt to feed the dough pieces toward the loaf forming mechanism.

It is another purpose of our invention to provide deflecting, guiding and sizing means of the above mentioned character that is adjustable so as to vary the speed thereof and to vary the position thereof relative to the panning and loaf forming mechanism conveyor belt, said adjusting means providing for the operation of the deflecting and guiding belt at an angle to said conveyor belt or parallel thereto as may be found desirable, dependent upon whether transverse curling or longitudinal curling of the sheeted piece of dough is to be performed and to adjust the speed so as to have the lineal travel of the belt engaging the top side of the dough piece the same as that of the conveyor belt engaging the under side thereof. Our improved deflecting, guiding and sizing means thus is adapted for use for either transverse or longitudinal curling of the sheeted dough piece as may be desired by the user thereof.

Due to the fact that the dough piece is slightly thickened along the side thereof that has the straight edge, it is desirable to provide means for slightly re-distributing the dough so as to have the flattened piece of dough of substantially the same thickness throughout its area, and it is a purpose of our invention to provide means for re-shaping the sheeted or flattened piece of dough sufficiently to obtain uniformity of thickness thereof, this being accomplished by means of a roller that engages the dough piece after it leaves the deflecting and stop mechanism, the roller being mounted above the conveyor belt leading to the loaf forming means and being vertically adjustable to engage pieces of sheeted dough to the desired extent to re-distribute the dough transversely of the piece the amount that is found to be desirable.

Other objects and advantages of our invention will appear as the description of the drawings proceeds. We desire to have it understood, however, that we do not intend to limit ourselves to the particular details shown or described, except as defined in the claims.

In the drawings:

Fig. 6 is a top plan view showing the sheeted piece of dough after it has been deflected and sized by our improved apparatus, and Fig. 7 is a fragmentary longitudinal sectional view through our improved loaf forming apparatus, showing the various steps of forming a loaf from a sheeted piece of dough.

Figure 1:
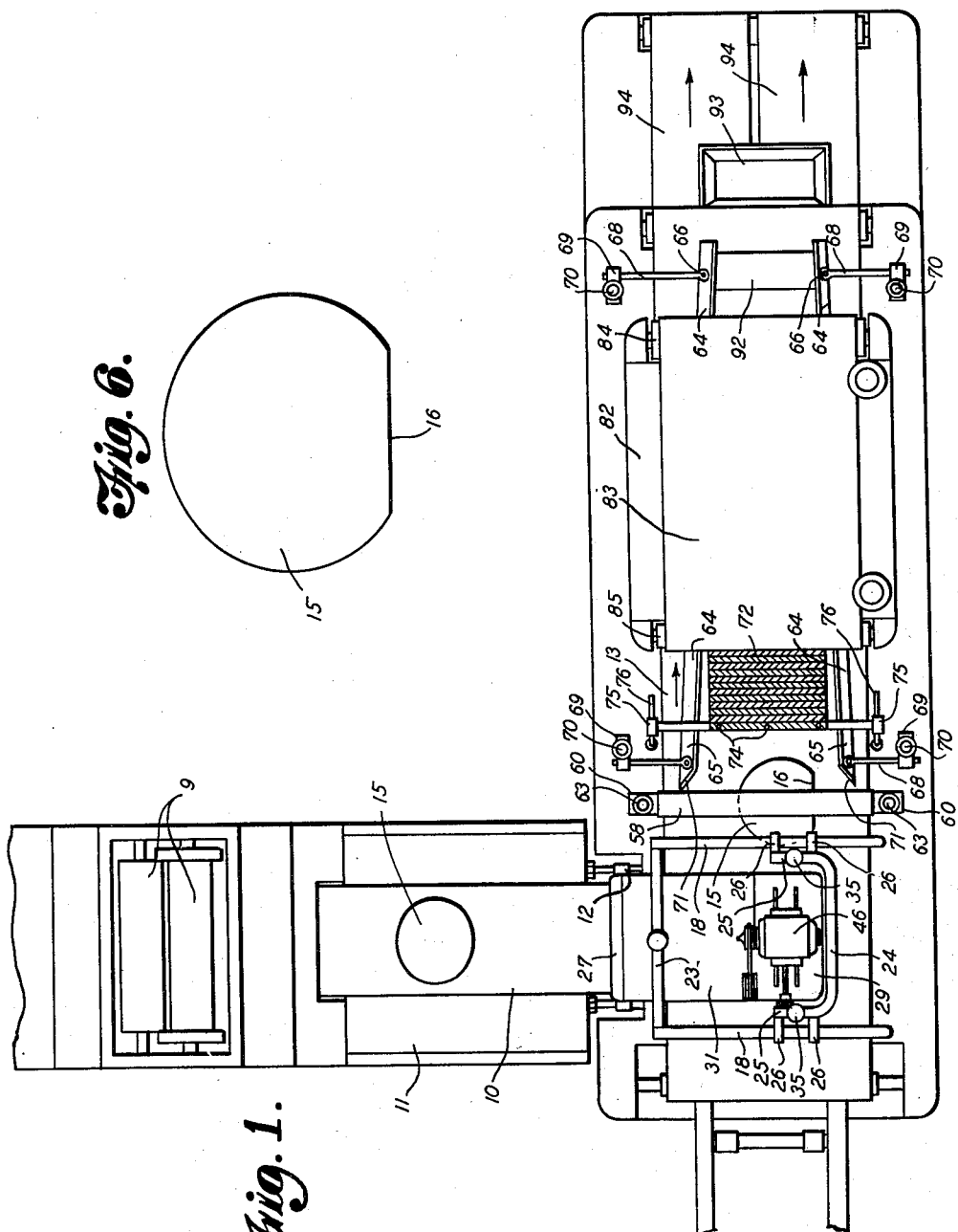
Fig. 1 is a top plan view, partly broken away, of a loaf molding and panning apparatus to which our invention is applied.
Figure 2:
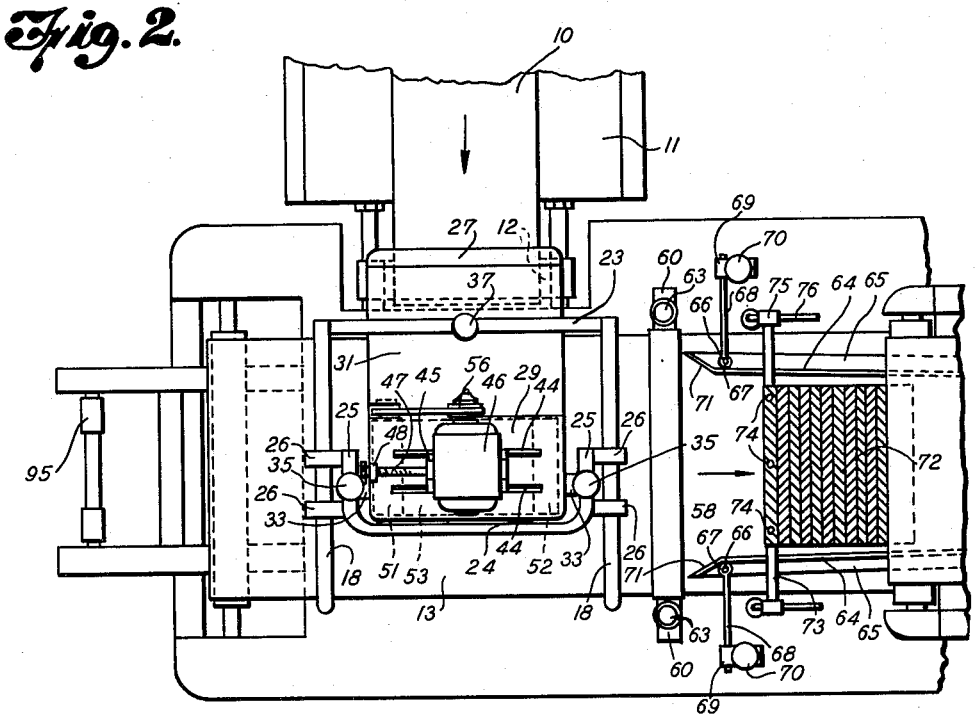
Fig. 2 is a fragmentary top plan view of the loaf molding apparatus on a somewhat larger scale.

Referring in detail to the drawings, in Figs. 1 and 2 is shown a portion of a bread molding machine that has a conveyor belt 10 mounted on a suitable frame 11 and operating over a roller 12, which is adjustably mounted in the frame, said conveyor belt extending from suitable sheeting mechanism 9, which may be of any standard or desired character. The conveyor belt 10 travels in the direction indicated by the arrow in Figs.

1, 2 and 3 and receives the dough pieces from the sheeting mechanism 9. The pieces of sheeted dough are traveling lengthwise of their direction of sheeting along the conveyor belt 10, that is, the direction in which the dough pieces were rolled by the sheeting mechanism is the same as the direction of travel of the belt 10 when these pieces of sheeted dough are located on said belt.

Figure 3:
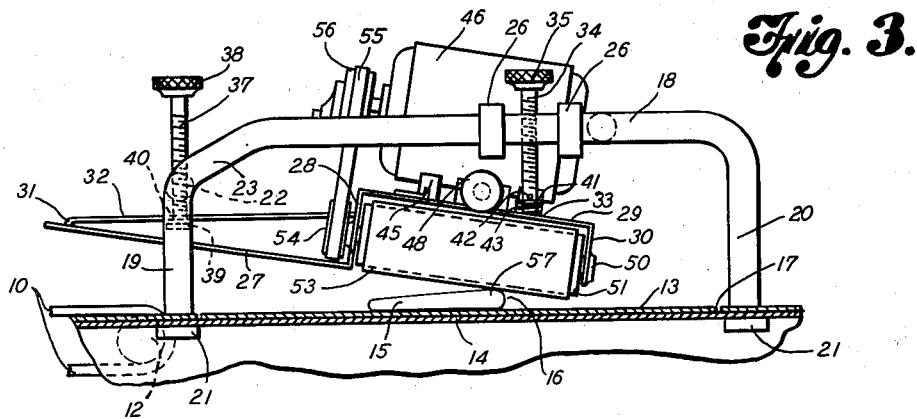
Fig. 3 is a fragmentary transverse sectional view through the panning and loaf forming conveyor, showing our improved deflecting, guiding and sizing means in end elevation.

A belt 13 of a loaf forming and panning conveyor is provided, which operates in the direction of the arrow thereon in Figs. 1 and 2, thus traveling transversely to the direction of travel of the conveyor belt 10. The conveyor belt 10 discharges the pieces of sheeted dough with considerable momentum off the end thereof toward the right as viewed in Fig. 3 across the conveyor belt 13. The conveyor belt 13 extends across a table-like member 14, said conveyor belt 13 having the upper run thereof traveling face to face on the top flat face of the table-like member 14, the said table-like member being mounted on a suitable frame. The tendency of the pieces of dough discharged from the conveyor belt 10 is to travel slightly upwardly as these leave the conveyor belt. The dough piece is indicated by the numeral 15 and is shown in Fig. 3 in position after it has reached the conveyor belt 13 and is in its proper position thereon.

In order to deflect the sheeted pieces of dough toward the conveyor belt 13 and prevent undesirable upward movement of the sheeted pieces of dough 15 away from said conveyor belt and assure the flatwise engagement of the sheeted pieces of dough with the conveyor belt, deflecting means is provided. Not only is it desirable to deflect the pieces of dough downwardly, but to stop the edge 16 of the dough piece 15 which was forward in its projection from the end of the belt 10, so that said forward edge 16 will have a definite spacing from the side edge 17 of the belt remote from the side thereof on which the conveyor belt 10 is located, to thus assure the exact position of said edge 16 and thus of the entire sheeted piece of dough transversely of the conveyor belt 13.

The means for deflecting and halting the transverse movement of the dough piece is provided with a frame that is secured to the table-like member 14, comprising a pair of transversely extending rod-like members 18, which have vertically extending end portions 19 and 20 that are secured to the table-like member 14 in any suitable manner, being shown as having enlargements or heads 21 thereon that are fixed to the under side of the table-like member 14. The rod-like members 18 are provided with obliquely extending or inclined portions 22 that connect the transversely extending portions thereof with the downwardly extending portions 19. Said frame also includes a longitudinally extending member 23 that is secured in fixed position, as by means of welding, to the members 18 at the junction of the inclined portions 22 and the vertical portions 19 thereof.

A carriage comprising a bar or rod-like member 24 having parallel transversely extending end portions 25 is mounted on the transversely extending members 18 by means of the collars 26, which are welded to the transversely extending portions 25 and are slidably mounted on the transversely extending bars 18, said collars 26 being arranged in pairs, as will be obvious from Figs. 1, 2, 3 and 5.

A deflector belt carrier is provided, which comprises a plate-like member 27 that has an upwardly directed portion 28 extending perpendicularly to the portion 27, a portion 29 extending parallel to the main body portion 27 thereof and upwardly offset relative thereto and a depending flange portion 30. A bracing plate 31 extends from the upwardly directed portion 28 to the plate-like member 27 near its end remote from the upwardly extending portion 28 and has a downwardly turned end portion 32 that is welded to the plate-like member 27, the bracing member 31 being also welded to the upwardly extending portion 28 of the plate-like member 27 at its point of engagement therewith. The portion 29 of the deflector belt carrier has a pair of brackets 33 welded thereto that extend forwardly and rearwardly from the portion 29 adjacent the flange 30. Screw-threaded adjusting members 34 engage screw-threaded openings in the transversely extending portions 25 of the carriage and have knurled heads 35, by means of which the same are adjustable, said screw-threaded members having heads 36 that are engaged with the under sides of the ears 33 and being rotatably mounted in suitable openings in said ears 33, said openings loosely receiving the members 34.

A screw-threaded member 37 having a knurled head 38 is screw-threadedly engaged with an opening in the longitudinally extending member 23 and is rotatably mounted in an opening in the bracing member 31. Said screw-threaded member has a reduced end portion that has a collar 39 fixed to the same, engaging the under side of the bracing member 31, and has a collar 40 fixed thereto on the upper side of the member 31 so that rotation of the member 37 by means of the knurled head 38 thereon will adjust the bracing member 31 and thus the plate-like member 27 to vary the spacing thereof relative to the longitudinally extending bar or rod-like member 23 of the frame.

Figure 5:
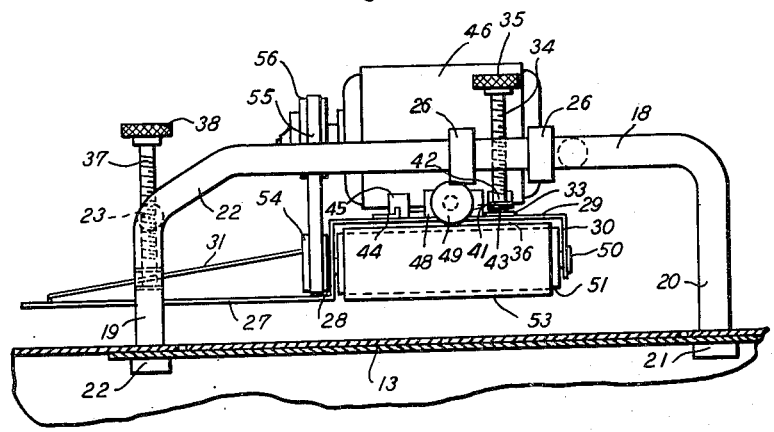
Fig. 5 is a view similar to Fig. 3 of the deflecting, guiding and sizing means in a different adjusted position.

The screw-threaded adjusting members 34 have washers 41 mounted thereon, the upward movement of said washers being prevented by means of pins 42 and coil springs 43 being mounted between said washers and the brackets 33. The springs 43 are of such strength that the same will hold the heads 36 firmly in engagement with the under sides of the brackets 33 in all adjusted positions of the parts. It will be obvious that the members 34 can be adjusted so as to locate the brackets 33 at any desired spacing from the conveyor 13 and that by adjusting the members 34 and 37 the plate-like member 27 can be adjusted to a position substantially parallel to the surface of the conveyor 13, as shown in Fig. 5, or at any desired oblique angle to the surface of the conveyor belt 13, such an oblique position for said plate-like member 27 being shown in Fig. 3. Also the plate-like member 27 and the parts carried thereby can be adjusted transversely of the conveyor belt 13 by adjustment of the carriage along the transverse members 18.

The upper portion 29 of the plate-like member 27 has a pair of guide rails 44 provided thereon, on which the base member 45 on which the electric motor 46 is mounted, is longitudinally slidable. Said base member 45 has a screw-threaded member 47 engaged therewith, that is rotatably mounted in a lug 48 that extends upwardly from the portion 29, said member 47 having a knurled head 49 thereon for rotating the same. It will be obvious that the motor 46 can be moved longitudinally of the rails 44 by means of the screw-threaded member 47.

Mounted in suitable bearings, such as the bearing 50 shown in Figs. 3 and 5, on the depending flange 30 and on the upstanding portion 28 of the plate-like member 27 are conveyor rollers 51 and 52. A conveyor belt 53 extends over the rollers 51 and 52 and the roller 51 has its shaft extending beyond the upstanding portion 28 of the plate-like member and has a pulley 54 mounted thereon to rotate therewith, and a belt 55 extends over the pulley 54 and over a variable speed pulley device 56 provided on the shaft of the motor 46. The variable speed pulley device 56 is of a well known standard character and the tension on the belt 55 determines the adjustment of said variable speed pulley. Thus if the motor 46 is moved toward the right in Figs. 1 and 2 the effective diameter of the variable speed pulley device 56 will be reduced and the rate of rotation of the conveyor roller 51 will be decreased, whereas if the motor 46 is moved to the left as viewed in Figs. 1 and 2 the opposite adjustment will occur and the speed of the conveyor roller 51 will be increased.

Figure 4:
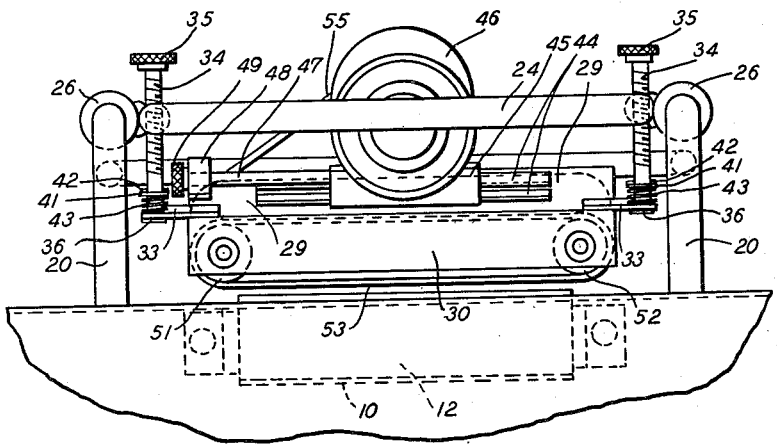
Fig. 4 is a fragmentary side elevational view of the deflecting, guiding and sizing means shown in Figs. 1 and 2, a fragmentary portion of the panning and loaf forming conveyor frame being shown.

It will be obvious that, by means of the speed adjusting means thus provided for the belt 53, said belt can be operated at the same lineal speed as the conveyor belt 13. The lower run of the belt 53 will travel in the direction indicated by the arrow in Fig. 4, which is the same as the direction of travel of the conveyor belt 13. Thus if the two belts are adjusted to exactly the same lineal speed a piece of sheeted dough 15 that passes into position between the deflector belt 53 and the conveyor belt 13 will be carried along between these two belts, and with the parts in the adjusted position shown in Fig. 3, the dough pieces 15 will be halted in their movement crosswise of the conveyor 13 by the belt 53 while being carried along between said belt 53 and the conveyor belt 13. The action of the belts 13 and 53 will prevent any working of the dough piece 15 and any distortion thereof, except a thickening of the dough piece 15 adjacent the edge 16 and the formation of a straight edge along the edge 16, as shown in Fig. 6. The straight edge 16 will lie parallel to the side edge 17 of the conveyor belt 13 and will be at a predetermined definite distance from the side edge 17 of the conveyor belt, which is dependent upon the adjustment of the position of the belt 53, which is determined by the adjustment of the screws 34 and 37 and of the carriage on the transverse members 18. The movement of the dough piece 15 transversely of the belt 18 will be halted at a point where the belt 53 is slightly more closely spaced relative to the conveyor belt 13 than the thickness of the sheeted piece of dough 15. However, due to the momentum of the dough piece 15 there will be a tendency for the dough to pile up or slightly thicken adjacent the edge 16, as shown at 57 in Fig. 3.

A roller 58 is provided above the conveyor belt 13 in spaced relation to the deflecting belt 53 and said roller is mounted to be freely rotatable in bearing members 59 that are vertically adjustable in upwardly extending standards 60 that extend upwardly from the table 14 on opposite sides of the conveyor belt. The standards 60 are shown as having rectangular openings 61 therein, in which the rectangular bearing blocks 59 are vertically slidable, adjustment thereof being obtained by means of the adjusting screws 62 that are provided with knurled heads 63 for adjusting the same.

Thus any adjustment of the roller 58 relative to the conveyor belt 13 can be obtained, but, preferably, the roller 58 is adjusted so as to have its axis of rotation extend parallel to the conveyor belt 13 and spaced a slight amount closer to the surface of the conveyor belt 13 than the thickness of the dough piece 15 at its thickened edge 16. The roller 58 will rotate with the dough piece 15 engaged therewith due to the motion of the conveyor belt 13, and inasmuch as the conveyor belt 13 is in engagement with the rigid table top 14 the roller 58 will exert a slight rolling or reshaping action on the dough piece 15 so as to distribute the thickened portion 57 of the dough piece over the adjacent area thereof so as to provide a flattened or sheeted dough piece that is of substantially the same thickness throughout its entire area after it leaves the roller 58 and passes between a pair of angular guide members 64 that extend lengthwise of the conveyor belt 13. This equalization of the thickness of the piece of dough will cause the edge 16 to become slightly convex instead of straight after leaving the roller 58.

The guide members 64 have horizontal flanges 65 that are pivotally connected by means of pivot members 66 with enlargements 67 on the ends of rod-like members 68, which rod-like members are adjustably clamped in brackets 69, the clamping means having knurled heads 70 thereon for tightening and releasing the clamping means from the rod-like members 68. It will be noted that there is a pair of said brackets 69 and a pair of said rod-like members 68 pivotally connected with the flanges 65 near the opposite ends of the guide members 64 and that any desired spacing of the guide members 64 transversely of the conveyor belt 13 can be obtained by means of the adjustable mounting thereof. It will also be noted that the entrance ends, which are the left hand ends, as viewed in Figs. 1 and 2, of said guide members 64, have the oblique upstanding flange portion 71 provided thereon to direct dough pieces into proper position between said guide members 64, and that said guide members 64 are spaced further apart at the entrance ends thereof than the width of said dough piece 15 crosswise of the belt 13. This adjustment of the guides 64 is desirable as it will permit the escape of any air trapped between the curls of the dough piece as it is curled up or rolled up on itself as described below.

The dough pieces 15 will thus pass into position between the guide members 64 as the same move from left to right as viewed in Figs. 1 and 2, and while said guide members 64 are shown as being in slightly converging relation from the entrance to the exit end thereof these may be arranged in parallelism or in any angular relationship to each other that may be found desirable to obtain the desired length of molded loaf.

A flexible chain mesh member 72 is mounted on a transverse bar 73 by means of upstanding pins 74, being detachable from said pins so that said flexible chain mesh member 72 can be adjusted on the bar 73 to a desired position crosswise of the conveyor belt 13. The bar 73 is mounted on brackets 75 that are longitudinally adjustable on the upper horizontal arms 76 of standards 77, which are in turn vertically adjustable in the brackets 78 mounted on the table 14.

The flexible chain mesh member 72 is thus adjustable to vary the location thereof lengthwise of the conveyor belt and the inclination thereof relative to the conveyor belt. The height of said chain mesh member 72 is, preferably, so adjusted that the end 79 thereof will only engage the sheeted dough piece 15 sufficiently to turn over the leading edge thereof slightly, as shown at 80 in Fig. 7. The edge 79 of the chain mesh member 72 is, preferably, furthermore so located by adjustment of said member 72 that it will be located closely adjacent and slightly under the forward inclined portion 81 provided on the pressure board 82.

The pressure board 82 is provided with a belt 83, which is ordinarily stationary, but is adjustable in position and operates over a roller 84 and a smaller roller 85 to thus provide the inclined portion 81 on said belt-like member. The belt-like member 83 is provided principally to provide an engaging surface for the pressure board that is adjustable so as to present a clean surface to the dough pieces when this is desired. The pressure board is mounted for vertical sliding movement up and down on standards 86 that extend through brackets 87 and said standards 86 are provided with adjustable stop members 88 to limit movement of the pressure board away from the conveyor belt 13.

As the piece of dough with the end 80 thereof turned back as shown in Fig. 7 moves under the pressure board 82 it engages the inclined forward face 81 thereof so as to further turn over or curl the piece of dough, and this curling action continues as the dough piece passes along under the pressure board in engagement with the bottom portion 89 of the belt-like member 83. The pressure board normally engages the dough pieces by the action of gravity, pressing down on the dough pieces so as to tightly roll up or curl the piece of sheeted dough on itself and firmly seal the adjacent surfaces of the layers or plies of the dough piece as it is curled up, any air trapped between the turns of sheeted dough escaping at the open ends of the coiled up piece of dough between said ends and the guides 64 spaced therefrom as the coiling or curling takes place, and finally rolls the curled-up piece of dough over between the pressure board and the conveyor belt so as to firmly seal the trailing edge 90 of the dough piece 15 to the adjacent body portion thereof. In Fig. 7 the dough piece is shown as being partly curled up on itself at 91 with the edge 90 trailing behind the curled-up portion. However, before the dough piece has left the pressure board it will be completely rolled up on itself and will pass in a rolled-up condition, as indicated at 92 in Fig. 1, from under the pressure board with its ends in engagement with the guides 64. The molded loaf 92 will then be in proper position and of proper length to be fed into the pan 93 without any possibility of the ends of the molded loaf overlapping the ends of the pan 93.

The pans 93 are moved into position to receive the molded loaves of bread on a conveyor comprising a pair of belts 94, which move in the direction indicated by the arrows in Fig. 1; said conveyor receiving the pans from a roller conveyor, of which one of the rollers 95 is shown in Fig. 1. The pan conveyor is provided with suitable means for presenting the pans 93 in proper position to receive the molded loaves 92, the details of construction of said means not forming part of this invention.

If, instead of feeding the dough pieces from a sheeting mechanism that is located to one side of the conveyor 13, the dough pieces are fed to the conveyor 13 from the left end thereof, as viewed in Fig. 1, then the plate 27 is adjusted as shown in Fig. 5 to locate the belt 53 with its lower run substantially parallel to the conveyor belt 13, in which case the belts 53 and 13 will cooperate to carry the dough pieces to the roller 58 and to the loaf forming mechanism above described, in a similar manner to that described above.

In operation, the pieces of sheeted dough 15 are fed from the sheeting mechanism under the plate-like member 27, which deflects the dough pieces toward the conveyor belt 13 and under the belt 53, the belt 53 further acting to deflect the dough pieces 15 toward the conveyor belt 13 as these are projected substantially horizontally across the conveyor belt 13. While the conveyor 10 is intended to project the dough pieces horizontally across the conveyor belt 13, due to the sudden discharge of said dough pieces 15 from the conveyor belt and the momentum that said dough pieces have, there is a tendency for the dough pieces to move upwardly away from the conveyor belt 13, the plate-like member 27 and belt 53 cooperating to prevent such undesirable movement away from the conveyor belt 13 and cause said dough pieces to engage flat with said conveyor belt. Furthermore when the plate-like member 27 is adjusted to an obliquely extending position relative to the conveyor belt 13, as shown for example in Fig. 3, the dough pieces 15, which are all of substantially uniform size, are stopped by wedging between the belt 53 and the belt 13 at a definite accurate spacing from the one side edge 17 of the belt 13 so that the edge 16 of said dough piece 15 will lie at such definite spacing from the side edge 17 of the conveyor belt.

At the same time the dough piece will be changed from a substantially circular shape, as shown on the conveyor belt 10 in Fig. 1, to substantially the shape shown in Fig. 6, with a straight side edge along the edge 16 thereof. The combined action of the belts 53 and 13 then carries these dough pieces 15 with the straight side edge 16 parallel to the side edge 17 of the conveyor belt under the roller 58 where these are slightly re-shaped so as to reduce the thickness of the slightly thickened portion 57 thereof, which is shown in Fig. 3. The dough pieces 15 after they leave the roller 58 are of uniform thickness. These then pass between the guides 64 and have the leading edges thereof turned back as shown at 80 in Fig. 7 by means of the flexible member 72 and are then completely curled up into a molded loaf and the adjoining faces of the adjacent layers firmly sealed together by means of the pressure board 82. Upon discharge from the pressure board said dough pieces which lie between the guides 64 pass along on the conveyor molded loaves 92 have been formed of a definite predetermined length and are located at an exact determined location on the conveyor belt 13, said molded dough pieces or loaves will pass into the pans 93 accurately and thus each molded loaf will be panned properly without any overlapping of the molded loaves on either end of the pan. Also due to the fact that the dough pieces 15 are fed to the loaf forming mechanism always at the same transverse location on the conveyor belt 13 and are of uniform size and of substantially uniform thickness throughout the entire area thereof, the loaves that will be formed will be of uniform cross sectional area from end to end and thus of uniform size after baking, avoiding any irregularly shaped or crippled loaves of bread.

What we claim is:

1. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt and means for moving the lower run thereof in the same direction as said conveyor belt.

2. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt, means for moving the lower run thereof in the same direction as said conveyor belt, and means for adjusting the speed of said second belt.

3. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt, means for moving the lower run thereof in the same direction as said conveyor belt, and means for adjusting the position of said second belt relative to said conveyor belt.

4. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt, means for moving the lower run thereof in the same direction as said conveyor belt, and means for adjusting the position of said second belt relative to said conveyor belt comprising means for varying the angular relationship of the lower run of said second belt to said conveyor belt.

5. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt, means for moving the lower run thereof in the same direction as said conveyor belt, and means for adjusting the position of said second belt relative to said conveyor belt comprising means for adjusting said second belt transversely of said conveyor belt.

6. In a molding machine, loaf forming means comprising a conveyor belt, means for feeding sheeted pieces of dough to said conveyor belt from one side thereof comprising means for projecting said pieces of dough crosswise of said conveyor belt, downwardly inclined means for deflecting said sheeted pieces of dough projected between said belt and said means toward the surface of said belt and halting said pieces of dough in their travel crosswise of said belt at a predetermined location transversely of said belt, and a roller engaging said sheeted pieces of dough on said conveyor belt after passing out of engagement with said deflecting means.

7. In a molding machine, loaf forming means comprising a conveyor belt, means for feeding sheeted pieces of dough to said conveyor belt from one side thereof comprising means for projecting said pieces of dough in a direction substantially parallel to the top face of and crosswise of said conveyor belt, means for downwardly deflecting said pieces of sheeted dough toward the surface of said belt and halting said pieces of dough in their travel crosswise of said belt at a predetermined location transversely of said belt, means engaging said sheeted pieces of dough on said conveyor belt after passing out of engagement with said deflecting means to equalize the thickness of said pieces of sheeted dough, and means for curling said sheeted dough pieces on themselves to form a loaf.

8. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt and extending at an oblique angle to said conveyor belt, and means for moving the lower run thereof in the same direction as said conveyor belt.

9. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt and extending at an oblique angle to said conveyor belt, means for moving the lower run thereof in the same direction as said conveyor belt and means for adjusting the spacing of said second belt from said conveyor belt.

10. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt comprising a belt mounted above said conveyor belt and extending at an oblique angle to said conveyor belt, means for moving the lower run thereof in the same direction as said conveyor belt and means for independently adjusting the spacing of the two side edges of said second belt from said conveyor belt.

11. In a molding machine, loaf forming means comprising a conveyor belt, inclined deflecting means above said belt, means for feeding sheeted pieces of dough to said conveyor belt from one side thereof comprising means for projecting said pieces of dough crosswise of said conveyor belt between said deflecting means and the top of said belt, said means deflecting said sheeted pieces of dough toward the surface of said belt and halting said pieces of dough in their travel crosswise of said belt at a predetermined location transversely of said belt, means for curling said sheeted dough pieces on themselves to form a loaf, and means for equalizing the thickness of said sheeted dough pieces between said deflecting means and said curling means.

12. In a molding machine, loaf forming means comprising a conveyor belt, means for feeding sheeted pieces of dough to said conveyor belt from one side thereof comprising means for projecting said pieces of dough crosswise of said conveyor belt, and means for deflecting said pieces of dough toward the surface of said belt and halting said pieces of dough in their travel crosswise of said belt at a predetermined location transversely of said belt, comprising a belt mounted above and extending at an oblique angle to said conveyor belt.

13. In a molding machine, a conveyor belt, loaf forming means cooperating therewith, means for feeding sheeted pieces of dough to said conveyor belt from one side thereof by projecting said pieces of dough crosswise of said belt, means for locating said sheeted dough pieces on said conveyor belt comprising combination inclined deflecting and stop means for the pieces of dough as the same are projected crosswise of said conveyor belt and a roller for equalizing the thickness of the pieces of dough on said conveyor belt between said deflecting and stop means and said loaf forming means, the spacing of said roller above said conveyor belt being adjustable.

14. In loaf forming means a conveyor belt, a belt mounted above said conveyor belt, said belt being disposed in such proximity to said conveyor belt as to define a slot-like space between said belts, means for driving the lower run thereof in the same direction as said conveyor belt, feeding means projecting sheeted dough pieces endwise therefrom crosswise of said conveyor belt into said slot-like space, and means for shifting said second belt bodily crosswise relative to said conveyor belt.

15. In a loaf forming means comprising a conveyor belt and curling means engaging said belt, a belt mounted above said conveyor belt, means for moving the lower run thereof in the same direction as the upper run of said conveyor belt, and sheeted dough piece projecting means at one side of said conveyor belt feeding sheeted dough pieces endwise of themselves across the opposed faces of said belts between the same.

16. In a loaf forming means comprising a conveyor belt and curling means engaging said belt, a belt mounted above said conveyor belt, means for moving the lower run thereof in the same direction as the upper run of said conveyor belt, and sheeted dough piece projecting means at one side of said conveyor belt feeding sheeted dough pieces endwise of themselves across the opposed faces of said belts between the same, said upper belt being mounted in position to confine said sheeted dough pieces to a predetermined path of projection onto said conveyor belt.

17. In loaf forming means comprising a conveyor belt, a feeding conveyor for projecting sheeted dough pieces across a marginal edge of said belt endwise from said feeding conveyor across said conveyor belt from one side thereof and means for deflecting said pieces of dough toward the surface of said belt extending over the discharge end of said feeding conveyor in spaced relation thereto and inclining downwardly from above said feeding conveyor over said belt transversely thereof.

18. In loaf forming means comprising a conveyor belt, a feeding conveyor for projecting sheeted dough pieces across a marginal edge of said belt endwise from said feeding conveyor across said conveyor belt from one side thereof and means for positioning said pieces of dough on said belt comprising a rigid deflector plate extending over the discharge end of said feeding conveyor in spaced relation thereto and inclining downwardly from above said feeding conveyor over said belt transversely thereof.

19. In loaf forming means comprising a conveyor belt, a conveyor for projecting sheeted dough pieces endwise therefrom across said conveyor belt from one side thereof and means for deflecting said pieces of dough toward the surface of said belt extending over the discharge end of said conveyor in spaced relation thereto and inclining downwardly over said belt transversely thereof, and means for mounting said deflecting means comprising means for adjusting the extent of said deflecting means over said conveyor and means for adjusting the inclination of said deflecting means relative to said belt.

20. In loaf forming means, a conveyor belt, a support adjacent the same, a carriage mounted on said support over said belt, a belt mounted above said conveyor belt on said carriage, means for moving the lower run thereof in the same direction as said conveyor belt, feeding means projecting said sheeted dough pieces endwise therefrom into the space between said belts substantially parallel to the top face of said conveyor belt, and means for varying the transverse angular relationship of the lower run of the second belt to said conveyor belt, comprising means for mounting said carriage for movement about an axis extending parallel to the length of said conveyor belt and means for adjusting said carriage about said axis.

JOHN E. MOHR.
MERLIN A. STICELBER.

References Cited in the file of this patent

UNITED STATES PATENTS

| Number | Name | Date |
| --- | --- | --- |
| 787,274 | Burns | Apr. 11, 1905 |
| 1,781,546 | Harber | Nov. 11, 1930 |
| 1,816,844 | Harber | Aug. 4, 1931 |
| 2,021,251 | Brykczynski et al. | Nov. 19, 1935 |
| 2,036,531 | Kosman et al. | Apr. 7, 1936 |
| 2,077,896 | Quick | Apr. 20, 1937 |
| 2,135,778 | Wyland | Nov. 8, 1938 |
| 2,323,537 | Harber | July 6, 1943 |
| 2,391,691 | Engels | Dec. 25, 1945 |